(12) United States Patent
Pappalardo et al.

(10) Patent No.: US 6,909,910 B2
(45) Date of Patent: Jun. 21, 2005

(54) METHOD AND SYSTEM FOR MANAGING CHANGES TO A CONTACT DATABASE

(75) Inventors: Susan Elizabeth Pappalardo, Kirkland, WA (US); Jason William Fuller, Bellevue, WA (US); Peter G. Chin, Seattle, WA (US); Jessica Dale Tenenbaum, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 10/061,763

(22) Filed: Feb. 1, 2002

(65) Prior Publication Data
US 2003/0148790 A1 Aug. 7, 2003

(51) Int. Cl.[7] .................................................. H04M 1/64
(52) U.S. Cl. .................... 455/558; 455/418; 455/414.1; 707/100; 707/101; 707/102
(58) Field of Search .............................. 455/558, 414.1, 455/418, 564, 565, 566, 567; 707/102, 101, 100; 70/100

(56) References Cited

U.S. PATENT DOCUMENTS 5,943,055 A * 8/1999 Sylvan ....................... 715/839
6,741,994 B1 * 5/2004 Kang et al. ................. 707/102
2003/0083046 A1 * 5/2003 Mathis ....................... 455/412
2004/0066920 A1 * 4/2004 Vandermeijden ......... 379/88.19

* cited by examiner

Primary Examiner—Nick Corsaro
Assistant Examiner—Alan T. Gantt
(74) Attorney, Agent, or Firm—Merchant & Gould P.C.

(57) ABSTRACT

Described is a system and method for updating a contact and adding a new contact from a call log in a communications device. The system includes a contact manager that is directed towards creating and updating call contact cards in a contact database with information retrieved from call logs of phone calls made to or from the communications device. In one embodiment, information is pre-populated into a predetermined data field of the contact card, thereby reducing workload to a user. The method includes determining if a request is for updating an existing contact card or for adding a new contact card to the contact database. The update or addition is made with information retrieved from call logs. Call information is pre-populated into a predetermined data field of the contact card, when it is determined that the request is to add a new contact card to the contact database.

10 Claims, 8 Drawing Sheets

METHOD AND SYSTEM FOR MANAGING CHANGES TO A CONTACT DATABASE

FIELD OF THE INVENTION

The present invention relates generally to mobile computing, and more particularly to updating a contact database within a mobile computing device.

BACKGROUND OF THE INVENTION

Manufacturers have recently observed an increased demand by businesses and consumers for multi-functional mobile communications devices. In response, manufacturers have added to mobile communication devices, such as mobile telephones, a wealth of applications and services. For example, many mobile telephones include such features as graphical displays to support web access, contact lists, and e-mail services, as well as other non-voice features.

Recently, some manufacturers have responded by combining the features of personal digital assistants (PDAs) with the features of mobile telephone devices. However, while the features of PDAs and mobile telephone devices have been physically combined into a single mobile device, many of the application programs continue to operate independently from each other. Moreover, much of the data associated with one application remains inaccessible by another application, often resulting in increased frustration and workload for the consumer.

SUMMARY OF THE INVENTION

This summary of the invention section is intended to introduce the reader to aspects of the invention and is not a complete description of the invention. Particular aspects of the invention are pointed out in other sections herein below and the invention is set forth in the appended claims, which alone demarcate its scope.

The present invention is directed towards providing a method and system for updating a contact and adding a new contact from call logs in a mobile communications device. The system includes a contact manager that is directed towards creating and updating contact cards in a contact database with information retrieved from call logs of phone calls made to or from the communications device. The method includes determining if a request is for updating an existing contact card or for adding a new contact card to the contact database. The update or addition is then made with information retrieved from call logs. According to one aspect of the present invention, information is pre-populated into a predetermined data field of the contact card, thereby reducing workload to a user.

In accordance with one aspect of the present invention, a computer-implemented method is directed towards managing changes to a contact database. The method includes receiving a request to update a contact card stored in the contact database with call information related to a phone call, retrieving a contact list of contact cards stored in the contact database, and receiving a selection of a contact card to be updated within the contact list. The method further includes updating the selected contact card with the call information related to the phone call, and replacing the existing contact card in the contact database with the updated contact card.

In another aspect of the present invention, a computer-implemented method is directed to managing changes to a contact database. The method includes receiving a request to create a new contact card in the contact database with call information related to a phone call. The method pre-populates a predetermined data field of the new contact card with call information; receives contact data to be associated with the call information; modifies a data field in the new contact card with the received contact data; and updates the contact database with the modified contact card. The predetermined data field includes at least one of a home phone number, a work phone number, and a mobile phone number.

In accordance with yet another aspect of the present invention, a computer-readable medium is encoded with computer-executable components. The components include a contact database, a call log, and a contact manager. The contact database is configured to store contact cards, wherein contact cards include data fields configured to contain contact information. The call log is configured to record incoming and outgoing phone calls, wherein each phone call corresponds to a call entry in the call log, and each call entry includes call information. The contact manager is coupled to the contact database and the call log, wherein the contact manager is arranged to update at least one data field in the contact card in the contact database with call information from a call entry in the call log in response to a user instruction.

Still another aspect of the present invention is directed towards a mobile communications device for creating a new contact card in a contact database. The device includes a contact database, a call log, and a contact manager. The contact database is configured to store contact cards, wherein contact cards include data fields for containing contact information. The call log is configured to log incoming and outgoing phone calls, wherein each phone call corresponds to a call entry in the call log, and each call entry includes call information. The contact manager is arranged to create the new contact card in the contact database with call information from a call entry in the call log in response to a user instruction.

In accordance with yet another aspect of the present invention, a device includes a graphical user interface and a user selection interface mechanism, and a method of activating a selection for changing a contact database. The method includes displaying a list of call entries in a call log of phone calls, displaying a context menu in response to a user selection of an entry in the call log, and displaying a plurality of options in the context menu, one of the options being to update a contact card in the contact database with call information from the selected entry in the call log.

Moreover, in yet another aspect of the present invention, a computer-readable medium is encoded with a plurality of data structures comprising a first data structure and a second data structure. The first data structure includes a plurality of call entries, each call entry describing call information about a phone call. The second data structure includes a plurality of contact cards, each contact card being associated with a contact. At least one contact card includes updated call information from a call entry in the first data structure.

BRIEF DESCRIPTION OF THE DRAWINGS

The foregoing aspects and many of the attendant advantages of the present invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention now will be described more fully hereinafter "with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the term "connected" means a direct connection between the things that are connected, without any intermediary devices or components. The term "coupled," means a direct connection between the things that are connected, or an indirect connection through one or more either passive or active intermediary devices or components. The meaning of "a," "an," and "the" include plural references. The meaning of "in" includes "in" and "on."

Briefly stated, the present invention provides a computer-implemented system and method for updating a contact database in a mobile communications device from information, such as a phone number, in a call log. The method includes determining whether the phone number is new or already exists in the contact database, and providing an opportunity for updating or adding the phone number to a contact card in the contact database.

Illustrative Operating Environment

Figure 1:
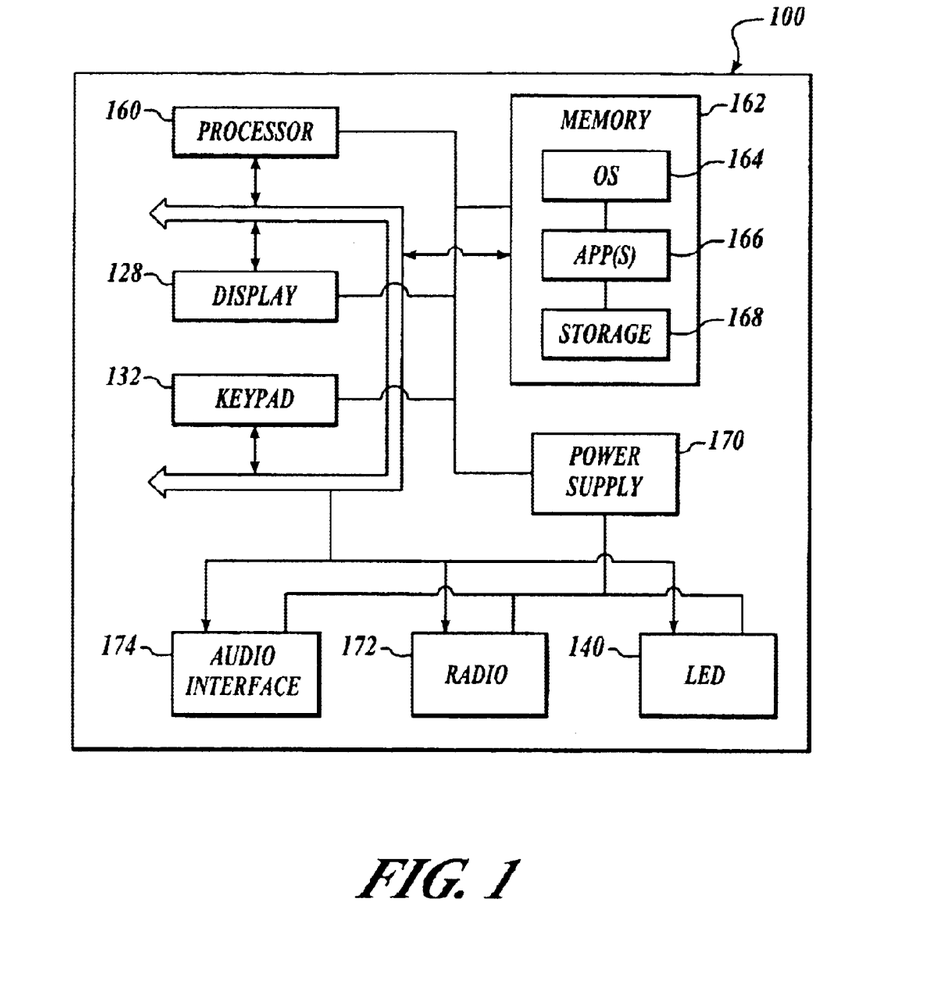
FIG. 1 is a functional block diagram illustrating an embodiment of an exemplary system for practicing the present invention.

FIG. 1 is a functional block diagram illustrating an embodiment of an exemplary communications device 100 for practicing the present invention. In one embodiment of the present invention communications device 100 is implemented as a mobile communications device, such as an integrated personal digital assistant (PDA) and wireless phone.

As shown in the figure, communications device 100 includes processor 160, memory 162, display 128, and keypad 132. Memory 162 generally includes both volatile memory (e.g., RAM) and non-volatile memory (e.g., ROM, Flash Memory, or the like). Communications device 100 includes an operating system 164, such as the Windows CE operating system from Microsoft Corporation or other such operating system, which is resident in memory 162 and executes on processor 160. Keypad 132 may be a push button numeric dialing pad (such as on a typical telephone), a multi-key keyboard (such as a conventional keyboard). Display 128 may be a liquid crystal display, or any other type of display commonly used in mobile computing devices. For example, display 128 may be touch-sensitive, and would then also act as an input device.

One or more application programs 166 are loaded into memory 162 and run on the operating system 164. Examples of application programs include phone dialer programs, contact manager, email programs, scheduling programs, word processing programs, spreadsheet programs, and so forth. Communications device 100 also includes non-volatile storage 168 within memory 162. Non-volatile storage 168 may be used to store persistent information which should not be lost if the communications device 100 is powered down. The application programs 166 may use and store information in storage 168, such as e-mail or other messages used by an e-mail application, contact information used by the contact manager, appointment information used by a scheduling program, documents used by a word processing application, and the like. A synchronization application may also reside on communications device 100 and is programmed to interact with a corresponding synchronization application resident on a host computer to keep the information stored in storage 168 synchronized with corresponding information stored at the host computer.

Communications device 100 also includes power supply 170, which may be implemented as one or more batteries. Power supply 170 might further include an external power source, such as an AC adapter or a powered docking cradle that supplements or recharges the batteries.

Communications device 100 is also shown with two types of external notification mechanisms: LED 140 and audio interface 174. These devices may be directly coupled to power supply 170 so that when activated, they remain on for a duration dictated by the notification mechanism even though processor 160 and other components might shut down to conserve battery power. LED 140 may be programmed to remain on indefinitely until the user takes action to indicate the powered-on status of the device. Audio interface 174 is used to provide audible signals to and receive audible signals from the user. For example, audio interface 174 may be coupled to a speaker for providing audible output and to a microphone for receiving audible input, such as to facilitate a telephone conversation.

Communications device 100 also includes radio 172 that performs the function of transmitting and receiving radio frequency communications. Radio 172 facilitates wireless connectivity between communications device 100 and the outside world, via a communications carrier or service provider. Transmissions to and from radio 172 are conducted under control of operating system 164. In other words, communications received by radio 172 may be disseminated to application programs 166 via operating system 164, and vice versa.

Radio 172 allows communications device 100 to communicate with other computing devices, such as over a network. Radio 172 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
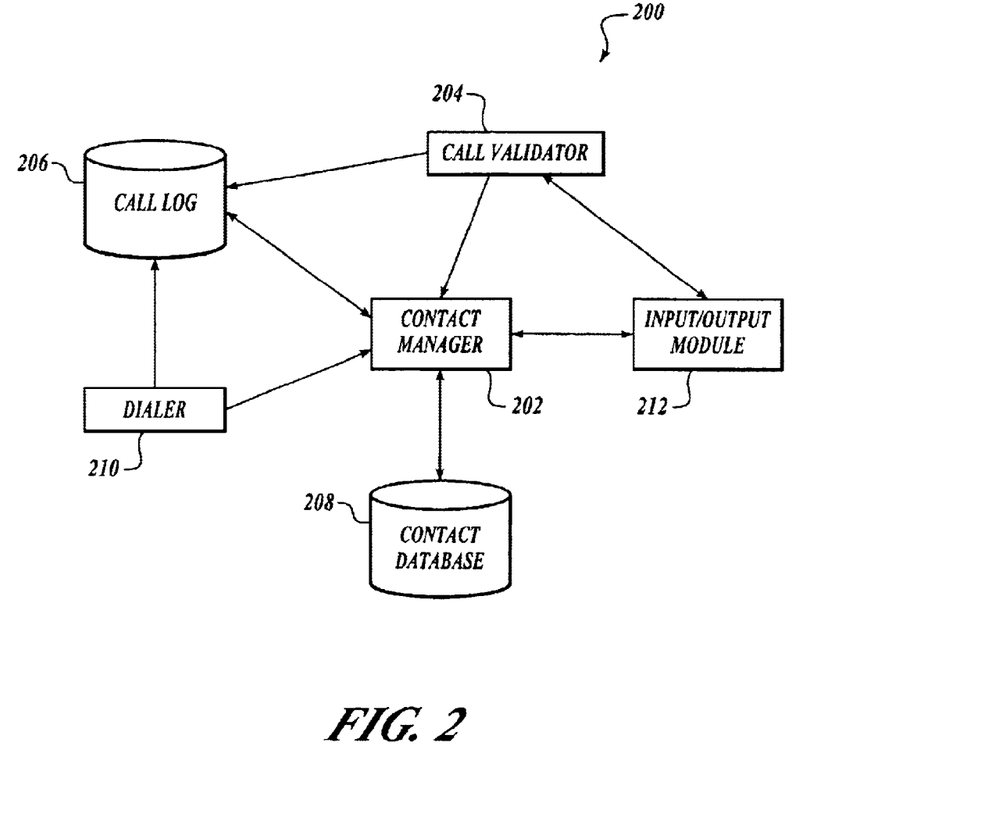
FIG. 2 is a functional block diagram of an embodiment of components in communications device 100 of FIG. 1 for managing changes to a contact database.

FIG. 2 is a functional block diagram of an embodiment showing components for managing changes to a contact database, in accordance with the present invention. Contact Management System 200 in FIG. 2 is an illustration of only one example of components and is not intended to suggest any limitation as to the scope of use or functionality of the present invention.

Contact Management System 200 may be described in the general context of computer-executable instructions, such as application programs 166, being executed in communications device 100, described in conjunction with FIG. 1. The invention may also be performed by a combination of hardware and computer-executable instructions.

As shown in the figure, Contact Management System 200 includes contact manager 202, contact database 208, call validator 204, dialer 210, call log 206, and input/output module 212. Each of these components may communicate with each other either directly or indirectly by passing messages through operating system 164.

Contact manager 202 is a software component that may be implemented within operating system 164 or as one of application programs 166 illustrated in FIG. 1. Contact manager 202 is configured to interact with other components in Contact Management System 200 to receive and manage changes to contact database 208.

Contact database 208 includes information related to a contact, such as people, businesses, and the like, with which communications device 100 may communicate. Contact database 208 may include contact information organized for each contact by separating the information of the contact into associated data fields, within a contact card. These data fields may include several phone numbers, e-mail addresses, pager number, contact name, and other call information related to the contact.

Contact database 208 is configured to receive instructions to create new contact cards and to update existing contact cards. The instructions may include the information to add to an existing contact card or with which to create a new contact card.

Call validator 204 includes software components that are configured to receive and decode call information about a caller of an incoming phone call. Call information may include a caller's phone number, the name of the caller, date and time of call, and the like. A communications carrier or service provider may provide call information to the callee of the incoming phone call when such information is available. When an incoming phone call is received (even if the phone call is not answered), call validator 204 may provide call information to call log 206 and contact manager 202. Call validator 204 may also provide call information to input/output module 212 for viewing through display 128 of FIG. 1.

Dialer 210 includes software components that are arranged to direct outgoing phone calls for communications device 100. Dialer 210 also may be in communications with and take directions from operating system 164 of FIG. 1. For example, operating system 164 may direct dialer 210 to make an outgoing phone call through radio 172 to a particular phone number provided by dialer 210.

Dialer 210 may make the outgoing phone call by requesting a wireless phone connection from a communications carrier or service provider through radio 172 (FIG. 1). When the wireless connection is established, dialer 210 may provide call information to call log 206, and contact manager 202. Call information may include phone number, date, time, call duration, and the like.

Call log 206 includes a record of calls made to and from communications device 100. In one embodiment call log 206 is implemented as a database. Each call is recorded as a call entry in call log 206. A call entry in call log 206 includes information about a particular phone call, such as phone number and whether the call was an incoming, outgoing, or missed call. Call entries may also include dates and times associated with the phone call.

Contact manager 202 may communicate with call log 206 to retrieve a call entry, or a category of call entries, such as missed calls. Contact manager 202 may incorporate additional contact information, such as a name, stored in contact database 208 that is associated with the call entry.

Furthermore, contact manager 202 may employ information in a call entry, in dialer 210, or in call validator 204 to create new contact cards or update existing contact cards within contact database 208.

Figure 4:
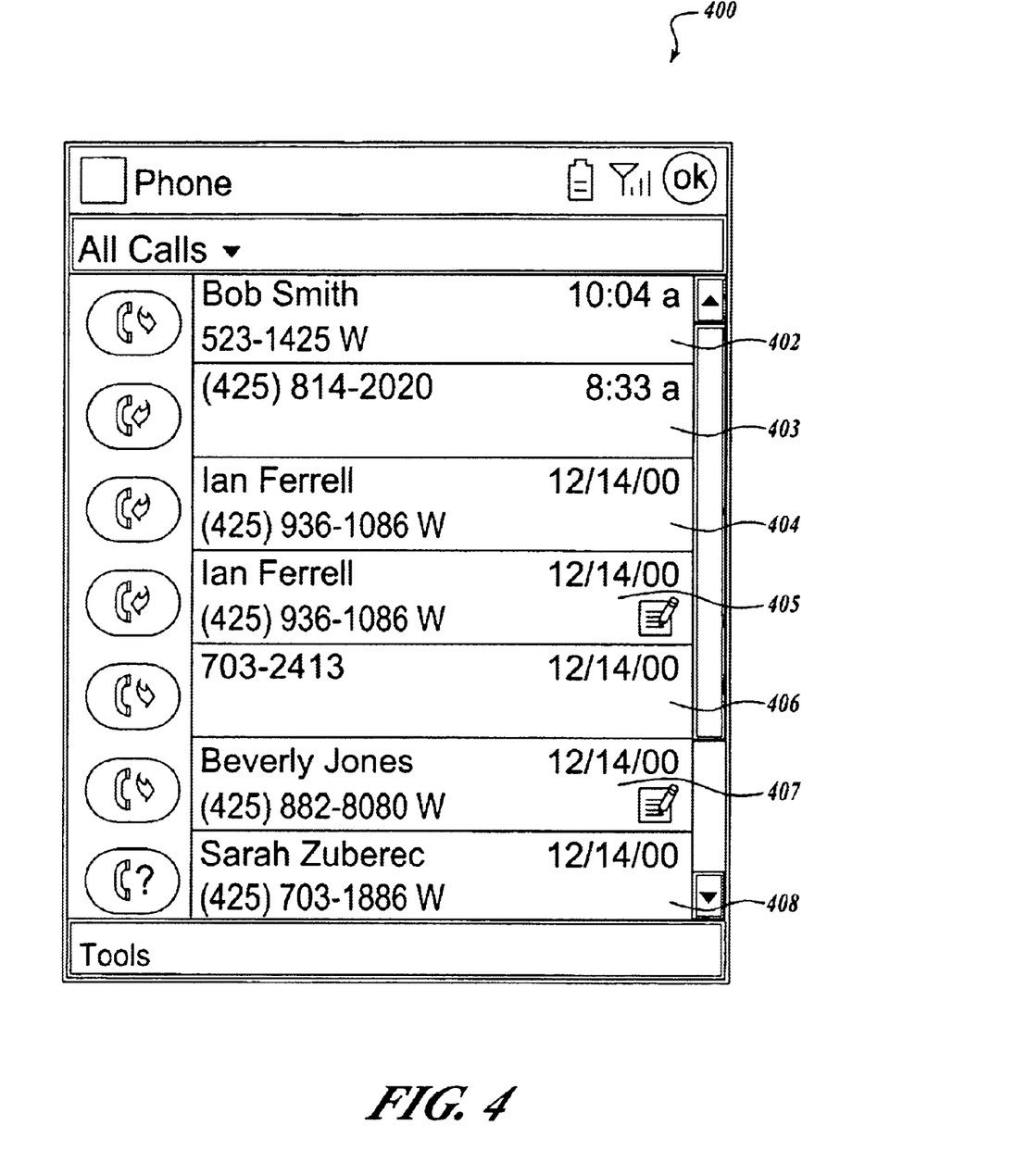
FIG. 4 is an illustrative screen shot of an embodiment of a user-interface (UI) for a call log of all calls.

Contact manager 202 also may provide the information to input/output module 212 for viewing through display 128 of FIG. 1. Briefly referring to FIG. 4 is an illustrative screen shot of an embodiment of a user-interface (UI) 400 for a call log, in accordance with the present invention. Included in UI 400 are call entry display field(s) 402–408. A typical call entry display field 402, may include name, phone number, date, time, and an indicator of whether the call entry is an incoming, outgoing, or missed call. It will be apparent that UI 400 may display only a subset of calls made to and from communications device 100 that the user has not deleted from call log 206. For example, UI 400 may display only outgoing, missed, or incoming calls, or a combination of the above. Moreover, while UI 400 illustrates only seven call entry display fields, UI 400 is not so limited, and more or less call entry display fields may be displayed, without departing from the scope or spirit of the present invention.

Input/output module 212 is a software component that is configured to provide input data to contact manager 202 that is received from hardware and other software components of communications device 100. Input/output module 212 also provides output data from contact manager 202 to other components of communications device 100. For example, keyboard 132 may inform contact manager 202 through input/output module 212 that an outgoing phone number has been entered by the user.

Generalized Operation

Figure 3:
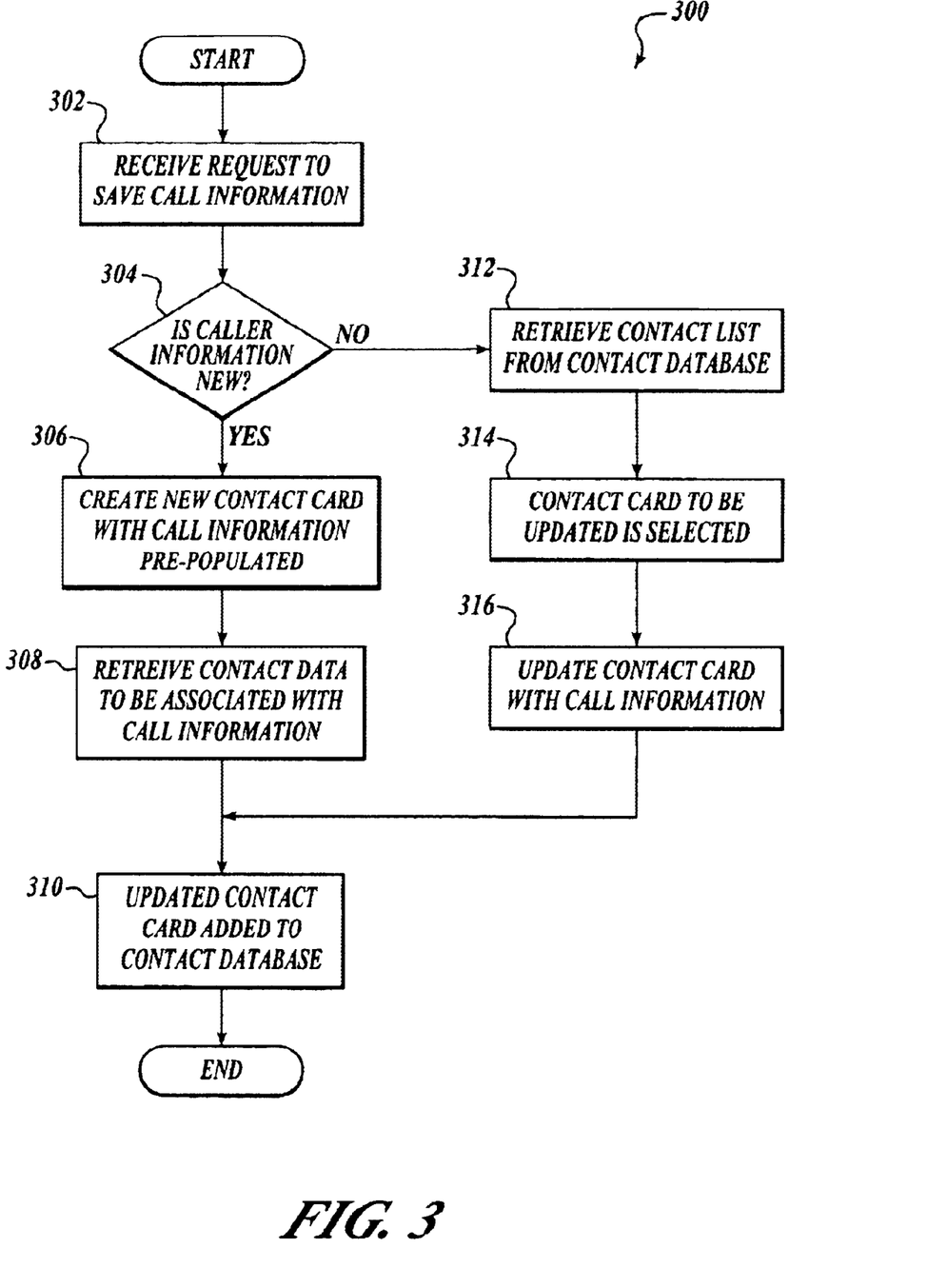
FIG. 3 is a flow diagram generally showing an embodiment of a process for updating and adding a contact to the contact database.

FIG. 3 is a flowchart generally showing an embodiment of an exemplary process 300 for updating and adding a contact to the contact database, in accordance with the present invention. Process 300 may be employed by contact manager 202 illustrated in FIG. 2.

FIGS. 5–8 are employed to provide illustrative examples to further aid in illustrating the flowchart.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Process 300 begins, after a start block, at block 302 where a request to save call information is received. In one embodiment of the present invention, call information is obtained from a call log, such as the call log shown in FIG. 4. However, call information may also be obtained from other sources, such as dialer 210 or call validator 204 shown in FIG. 1, without departing from the scope or spirit of the present invention.

Figure 5:
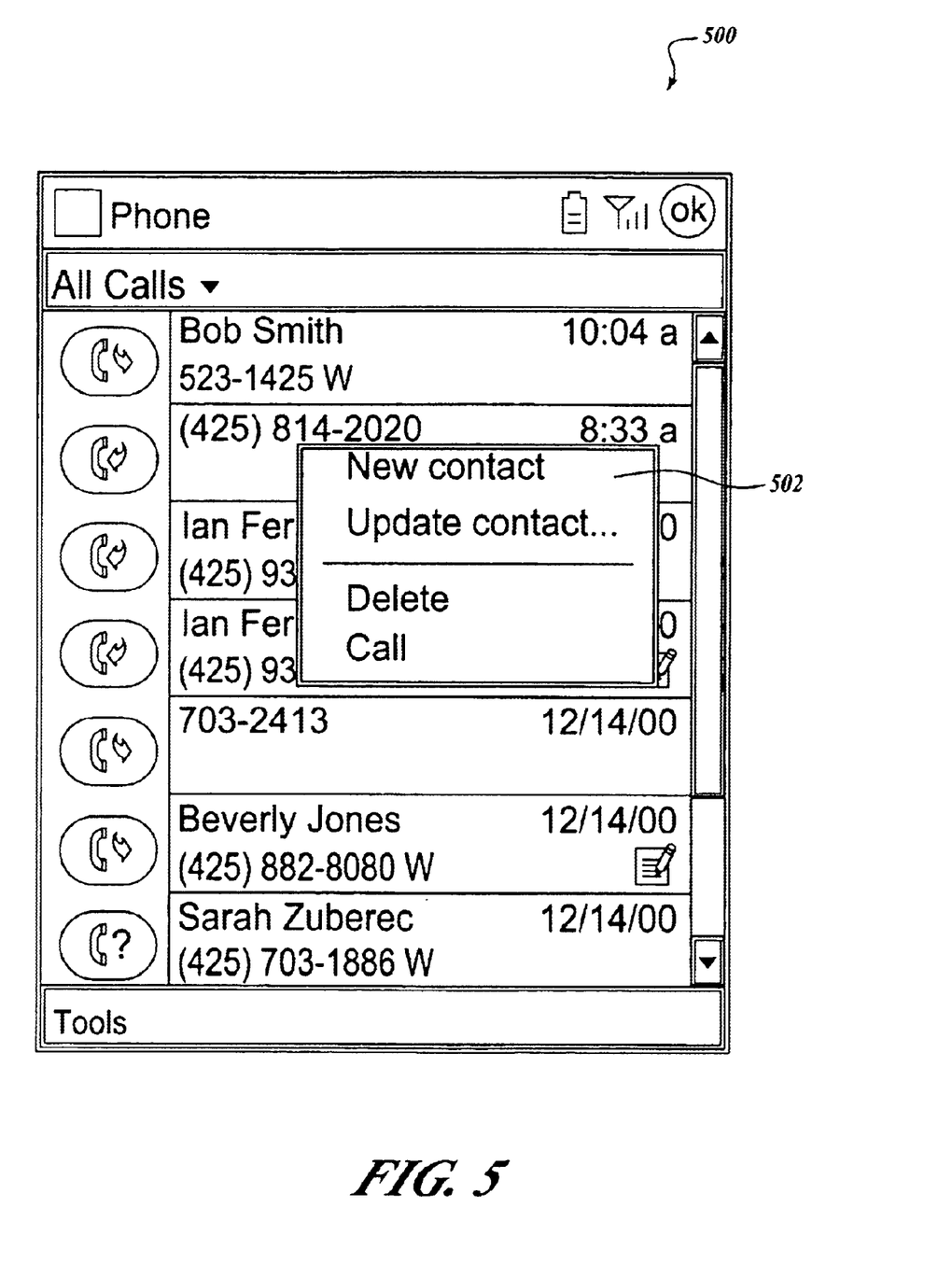
FIG. 5 is an illustrative screen shot of an embodiment of a UI for a context menu for updating or adding a contact card to the contact database.

In one embodiment of the present invention, when the user selects an entry in the call log, a context menu is displayed to the user. The context menu is configured to provide a user selectable choice to create a new contact, or to update an existing contact in the contact database. Briefly, FIG. 5 is an illustrative screen shot of an embodiment of a user-interface (UI) for a context menu 502 for updating or adding a contact to the contact database, in accordance with the present invention. When the user-interface includes a touch-sensitive display, a user may select an entry in the call log by tapping, touching, or otherwise triggering a selection within the call entry display field (such as tapping within call entry display field 402 of FIG. 4).

In another embodiment, context menu 502 includes a view contact option (not shown) that a user may select to view an existing contact card. Moreover, the view contact option also is accessible from the dialer main screen.

In yet another embodiment of the present invention, a request to save call information may be initiated through a user selection of a SAVE command, such as during a current incoming or outgoing call.

Upon receiving a request to save call information, process control flow proceeds to decision block 304.

At decision block 304, a determination is made whether the call information is for a new contact or an existing contact in the contact database. In one embodiment of the present invention, the user selects from the context menu either to create a new contact card or to update an existing contact card. In one embodiment, when the user-interface includes a touch-sensitive display, selection within context menu 502 of FIG. 5 includes tapping, touching, or otherwise triggering the desired selection. In another embodiment of the invention, when the user selects to SAVE the call information, the user is provided the choice to create a new contact, or to update an existing contact in the contact database.

If it is determined at decision block 304, that the user has selected to create a new contact in the contact database, process control flow proceeds to block 306, where a new contact card is created employing the call information.

At block 306, in one embodiment of the present invention, a new contact card is displayed to the user with the call information pre-populated into a data field. For example, the phone number within the call information may be pre-populated into a work telephone number data field, thus reducing the overall workload to the user. In another embodiment, the pre-populated data field may be at least one of a work, a home, a mobile, a pager, a car, a radio, and an assistant telephone number data field.

Figure 6:
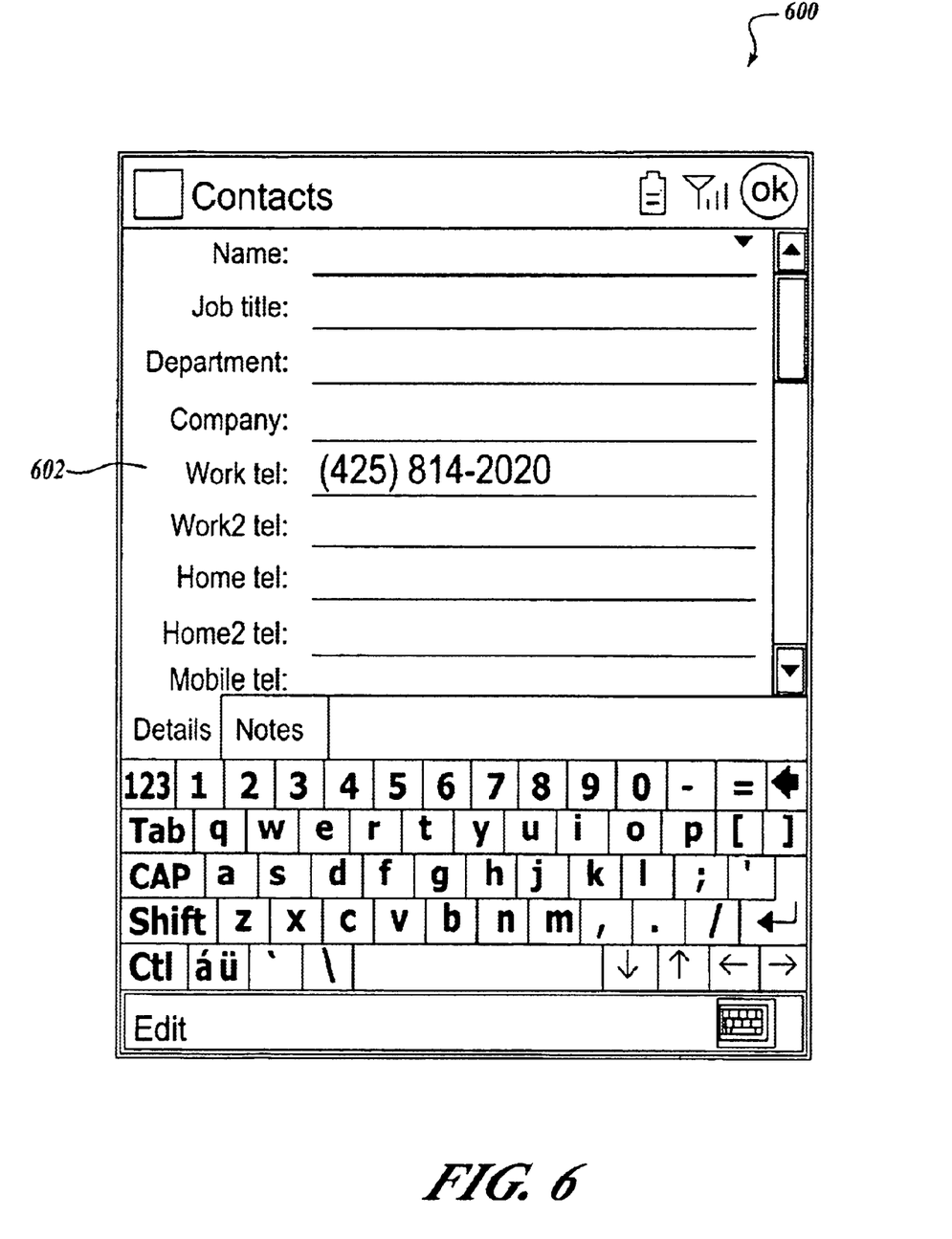
FIG. 6 is an illustrative screen shot of an embodiment of a UI for a contact card for a new contact with a prepopulated phone number entry.

For example, FIG. 6 illustrates a screen shot of an embodiment of a UI for contact card 600 for a new contact with pre-populated phone number entry 602, in accordance with the present invention.

In still another embodiment, the user may be provided with a user selectable menu for placing the phone number into a work, a home, a mobile, or a similar telephone data field, thereby increasing the flexibility to the user.

Upon completion of block 306, process control flow moves to block 308. At block 308, additional contact information associated with the contact is received. Such contact information may include additional information the user wishes to save in the contact database, such as the contact's name and address. The user may also relocate pre-populated call information into a different data field. Process control flow continues to block 310.

Back at decision block 304, if it is determined that the user has selected to update an existing contact in the contact database, process flow control proceeds to block 312.

Figure 7:
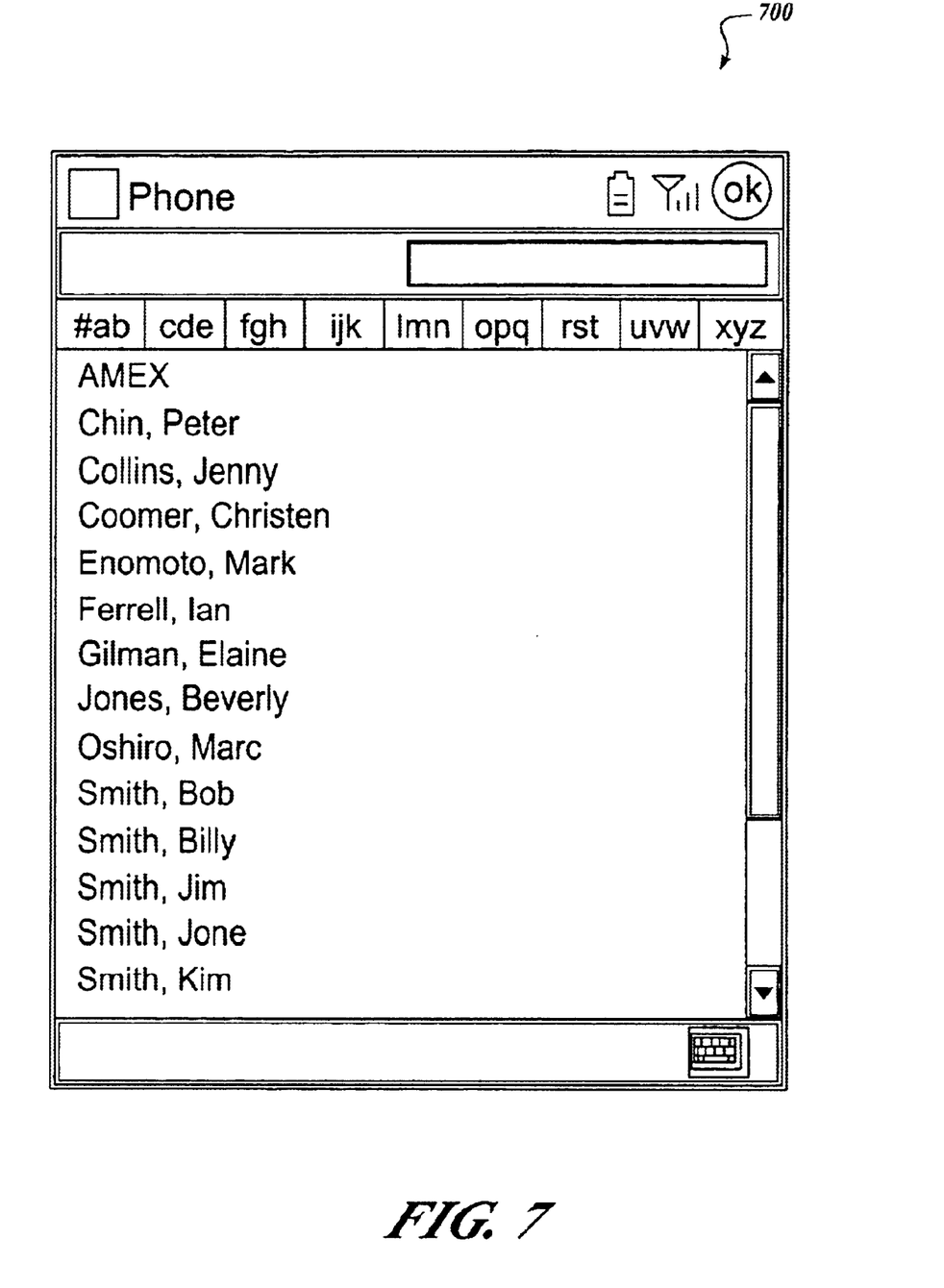
FIG. 7 is an illustrative screen shot of an embodiment of a UI for a contact list from the contact database.

At block 312, a contact list of contact names in the contact database is provided to the user. FIG. 7 is an illustrative screen shot of an embodiment of a UI for contact list 700 from the contact database, in accordance with the present invention. Typically, contact list 700 is displayed as an alphabetically sorted list by contact's last name; however, the invention is not so limited. For example, the contact list may be sorted by the most recent call (incoming or outgoing) to the least recent call, or any other order, without departing from the scope or spirit of the present invention. Process flow control continues to block 314.

Figure 8:
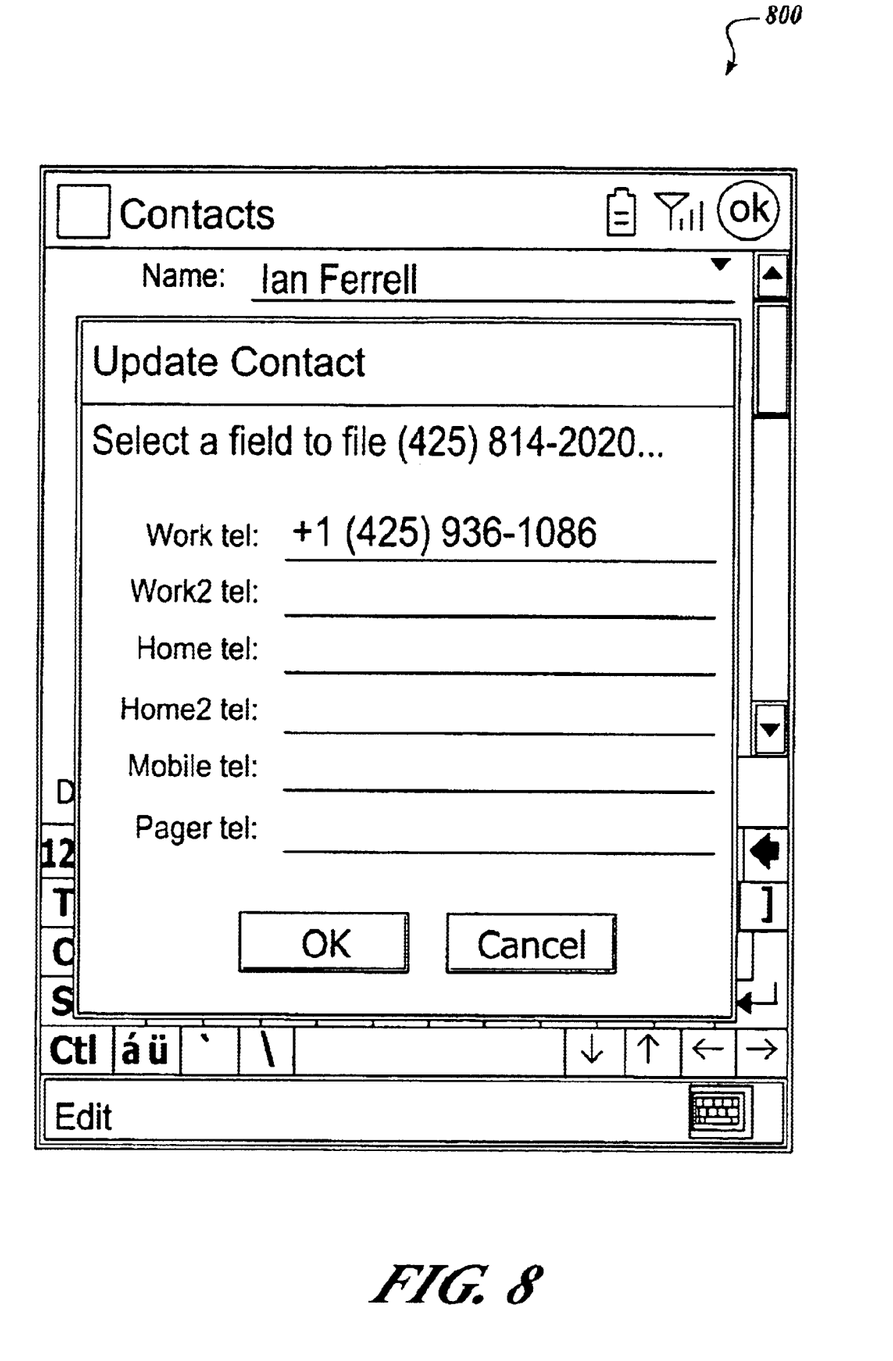
FIG. 8 is an illustrative screen shot of an embodiment of a UI for an update contact card, in accordance with the present invention.

At block 314, a selection of the contact card to be updated is received from the user. In one embodiment of the present invention, an update contact card is provided to the user. FIG. 8 is an illustrative example of an embodiment of update contact card 800, in accordance with the present invention. As shown in FIG. 8, update contact card 800 is configured to enable the user to select a data field to update with the call information.

In another embodiment of the present invention, the user is provided with a predetermined user selectable menu for placing the phone number into a work, home, or mobile telephone number data field.

Upon completion of block 314, process control flow moves to block 316. At block 316, the selected contact card is updated with the call information. For example, selection of the data field transfers the call information into that data field. Furthermore, the user may delete content of a data field, move content to a different data field, and update additional data fields for the selected contact card. For example, the user may select to insert the phone number into multiple telephone number data fields. Process control flow moves to block 310.

At block 310, the modified contact card is added to the contact database. If the contact card is an updated contact card, the previous contact card is deleted and replaced by the updated contact card. Upon completion of block 310, the logical process control flow ends.

Although the above description has illustrated updating the contact database from a call log, the present invention is not so limited. For example, the contact database may also be updated from a telephone number obtained from a dialer, or a call in progress.

CONCLUSION

The above specification, examples, and data provide a complete description of the manufacture and use of certain embodiments of the invention. Since many embodiments of the invention can be made without departing from the spirit and scope of the invention, the invention resides in the claims hereinafter appended.

We claim:

1. A computer-readable medium having computer-executable instructions for updating a contact database in a mobile communications device, the instructions comprising:

receiving a request to save call information related to a phone call;

determining if the request to save the call information is an update to existing information in a contact card stored in the contact database or a request to create a new contact card in the contact database;

if the request is to update existing information, retrieving a contact list of contact cards stored in the contact database;

receiving a selection of a contact card to be updated within the contact list;

updating the selected contact card with the call information related to the phone call;

replacing the existing contact card in the contact database with the updated contact card;

else if the request is to create a new contact card, pre-populating a data field of the new contact card with call information;

receiving contact data to be associated with the new contact card;

modifying a data field in the new contact card with the received contact data; and updating the contact database with die modified contact card.

2. The computer-readable medium of claim 1, wherein the contact list comprises a list of at least one contact name associated with a contact card stored in the contact database.

3. The computer-readable medium of claim 1, wherein the call information comprises a phone number.

4. The computer-readable medium of claim 1, wherein the call information comprises a name of a caller.

5. The computer-readable medium of claim 1, wherein the call information comprises a date of the phone call.

6. The computer-readable medium of claim 1, wherein the call information comprises a time of the phone call.

7. The computer-readable medium of claim 1, wherein the call information comprises a duration of the phone call.

8. The computer-readable medium of claim 1, wherein the pre-populated data field includes at least one of a home phone number, a work phone number, and a mobile phone number.

9. The computer-readable medium of claim 1, wherein the pre-populated data field is determined by evaluating a time associated with the phone call.

10. In a computer device having a graphical user interface and a user selection interface mechanism, a method of activating a selection for changing a contact database, comprising the steps of:

displaying a list of call entries in a call log of phone calls;

displaying a context menu in response to a user selection of an entry in the call log; and displaying a plurality of options in the context menu, one of the options being to update a contact card in the contact database with call information from the selected entry in the call log, wherein an existing contact card is replaced with the updated contact card.

* * * * *